July 18, 1961  F. H. NORTON  2,992,516
METHOD OF MAKING FIBER OPTICAL COMPONENTS
Filed July 3, 1957  2 Sheets-Sheet 1

INVENTOR
FREDERICK H. NORTON
BY
Louis L. Gagnon
Noble J. Williams
ATTORNEYS

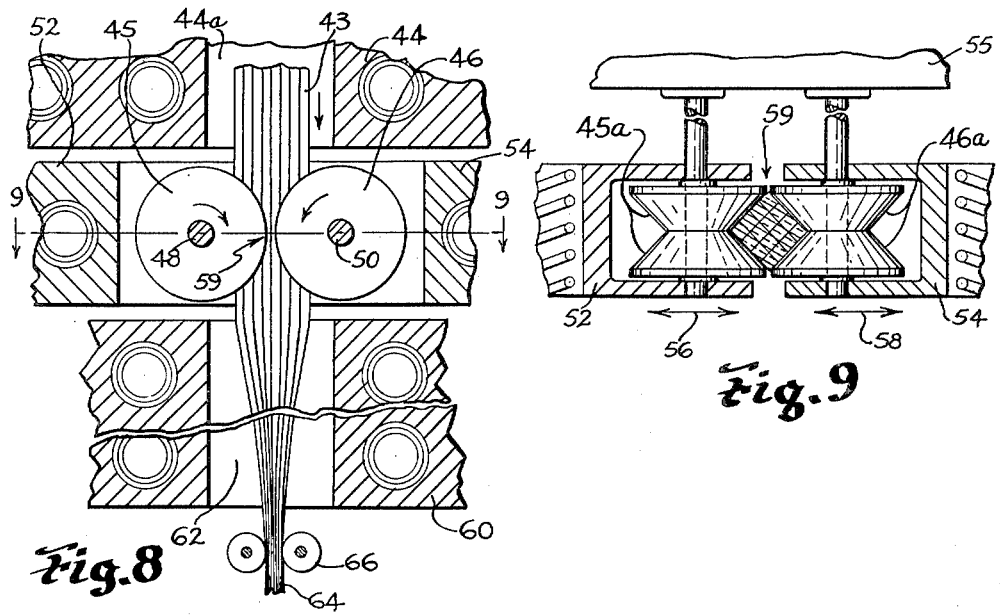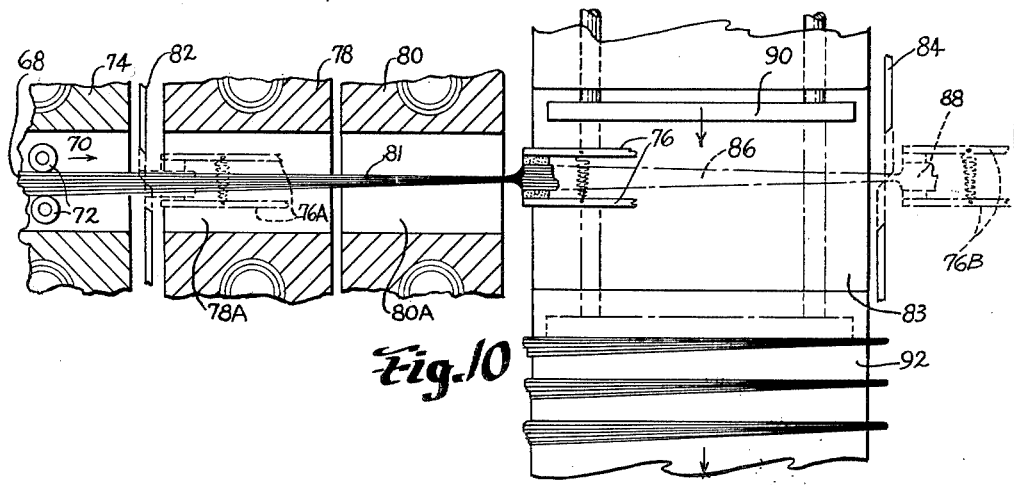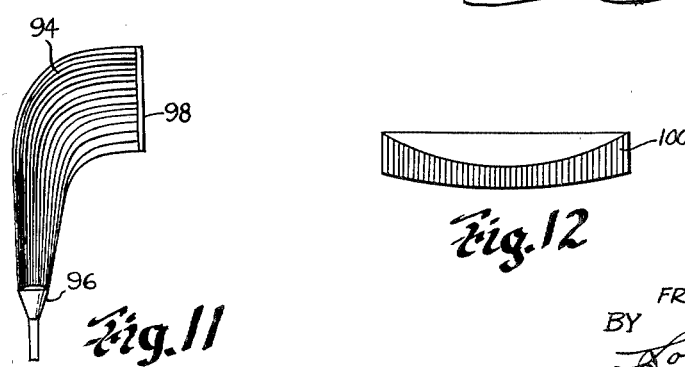
INVENTOR
FREDERICK H. NORTON

… …

United States Patent Office 2,992,516
Patented July 18, 1961

2,992,516
METHOD OF MAKING FIBER OPTICAL COMPONENTS
Frederick Harwood Norton, Boston, Mass., assignor to American Optical Company, Southbridge, Mass., a voluntary association of Massachusetts
Filed July 3, 1957, Ser. No. 669,883
15 Claims. (Cl. 49—79)

This invention relates to a method of manufacture of light-conducting fiber optical devices and components of novel construction. More particularly, the invention relates to a method of manufacture of light-conducting fiber optical devices and components by an assembling, fusing and drawing technique so that each fiber optical component or device produced thereby will be produced in a more efficient, rapid and accurate manner and will comprise a very large number of very small similar light-conducting fibrous elements or filaments positioned in part or entirely in side-by-side grouped relation to each other in such a manner that each individual element or filament thereof will function independently and efficiently in conducting light from one end thereof to the other, and collectively all of the filaments will function to provide an image transfer device or component having good resolution and contrast.

It has been known for a long time that many thin long transparent filaments of glass can be bunched together and used to transmit light and even transmit an optical image from one location to another, but this has only been accomplished with a limited degree of success. Prior devices of such character have not been as satisfactory as might be desired due largely to the fact that light from one filament would escape or scatter to an adjacent filament or even to several adjacent filaments, both at points of contact between the filaments and at areas surrounding these points, and would not only deteriorate the quality of the light within individual filaments but would also have the overall effect of confusing the definition and contrast of the image being transmitted. Thus the reproduced image would appear "washed out" and the parts of the image which should appear sharp and clear would actually appear roughed and blurred. Attempts have been made to prevent this optical interaction between filaments, as for example, by cementing the filaments together by the use of a black paint or by keeping the filaments air spaced from one another. But such attempts have not produced successful devices. Too much light was absorbed in the one case by the black paint and too much space was "lost" between filaments at the end of the device in the other case thereby naturally reducing the image resolution which could be obtained. Furthermore, when the number of light-conducting fibers or filaments for forming an image transfer device is increased to give high degrees of image resolution, the problem of assembly becomes increasingly more difficult, because it is necessary to have each fiber of the bundle being formed positioned in the bundle in an orderly array since the reproduced image at the exit end thereof depends directly upon the arrangement of the individual fibers at the entrance end of the bundle. For example, if a transfer device of four inches in cross-sectional area is to be produced and if as many as 250,000 filaments per square inch are to be employed, the problem of assembly alone has been heretofore practically insurmountable. The method of the present invention has greatly reduced the difficulties of forming optical image transfer devices of the above-mentioned character.

In co-pending O'Brien application Serial No. 469,877, now issued as Patent No. 2,825,260, however, there is disclosed an optical image transfer device in which such optical interaction between individual filaments of the very large number of very small filaments of the device is prevented and thus good image contrast and resolution are obtained. This improved device, it should be noted, comprises not only a very large number of very small filaments each having a core of light conducting high index material but also has each individual core completely coated throughout its length with a very thin layer of transparent material of a lower refractive index; and each coating is applied in such a way that good optical contact with the smooth outer surface of its supporting core is accomplished before the many filaments for making up a bundle are actually bunched together. Thus in the finished assembled device or component each core is optically insulated from the next and the bunched ends of adjacent filaments provide a cross sectional end area of very high light accepting efficiency.

The present invention provides a method by which optical image transfer devices and components of the above improved type may be made.

It is accordingly an object of the present invention to provide a novel assembling, fusing and drawing method for producing optical devices and components comprising in each case a plurality or even a very large number of small or very small elongated light-conducting elements positioned in fixed side-by-side parallel relation to each other, at least at an end portion thereof, as well as fused optical image transfer components.

It is also an object of the present invention to provide a method by which such optical image transfer devices and components, both tapered and straight sided, may be made having suitable means for ensuring transmission of a very high degree of the light which enters the individual elements or filaments at one end thereof through the entire lengths of the elements without appreciable loss of light therefrom.

It is an additional object of the invention to provide a method for producing optical devices and components having the above characteristics and which are either of a rigid or semi-flexible, or even flexible nature.

Other objects and advantages of the invention will become apparent from the detailed description which follows when taken in conjunction with the accompanying drawings in which:

FIG. 8 is a sectional view of different apparatus for use in performing fusing and drawing steps of said method;

FIG. 9 is a sectional view taken substantially upon section line 9—9 of FIG. 8;

FIG. 10 is a sectional view of apparatus for use in performing additional steps of said method;

FIG. 11 is a side elevational view of an optical image transfer device made in accordance with the present invention; and FIG. 12 is a sectional view of a different form of optical image transfer device embodying the present invention.

Figure 1:
FIG. 1 is an elevational view of an assembly of parts for use in carrying out the method of the present invention.

In FIG. 1 is shown a plurality of thin elongated shafts or rods 12 of glass positioned together in side-by-side parallel contacting relation to each other so as to form a bunch or bundle 14. This bundle may be, as clearly indicated in the enlarged cross-sectional view of FIG. 2, formed of rods or shafts of like size and cross-sectional shape, and generally but not necessarily the bundle will be of a thickness which is approximately equal to the width thereof. These rods are for convenience in carrying out of the method preferably all of approximately the same length.

Figure 2:
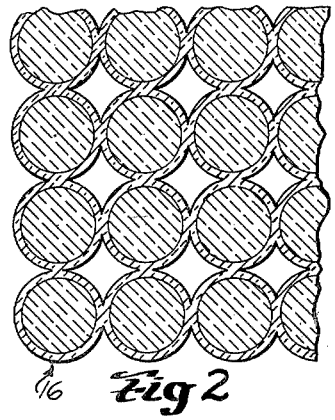
FIG. 2 is a cross-sectional view taken substantially upon section-lines 2—2 of FIG. 1 and showing parts considerably enlarged.
Figure 4:
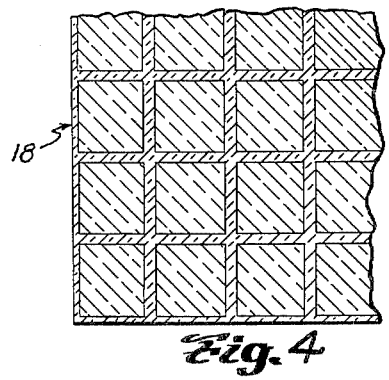
FIGS. 4 and 5 are cross-sectional views of other forms which the parts of the assembly of FIG. 1 may have for carrying out the invention.
Figure 5:
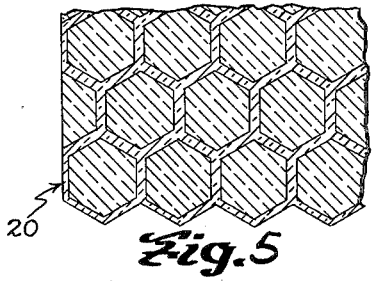

As will be clear from inspection of FIGS. 4 and 5, as well as FIG. 2, while the rods of an individual fused together bundle of rods are of like size and cross-sectional shape, nevertheless, both the size and the cross-sectional shape of the rods for the forming of different bundles may differ appreciably. That is to say, the cross-sectional shape of individual rods of a bundle may be generally round as indicated at 16 in FIG. 2; or square as indicated at 18 in FIG. 4; or hexagonal as indicated at 20 in FIG. 5, or of some other geometrical shape, if desired; it being well to keep in mind, however, that the preferred arrangement is that which will have as much of the end area of such a bundle of rods as possible available and suitably prepared for receiving incident light for transmission through the bundle. However, in certain instances, it may be that the square shaped rods 18 of FIG. 4, for example, will be preferable to the circular rods 16 of FIG. 2 since, in the case of square rods, most or all of the voids between or among the rods will be substantially eliminated and more area will be available for light transmission. Additionally if a hermetical seal is required, such voids can be, by such a geometric pattern, completely avoided. However, at other times it may be more desirable to provide a certain degree of porosity in the finished image transfer device or component and in such a case circular rods, as shown in FIG. 2, or the like might be preferred. It may be that the use of other shapes of rods will be, at other times, preferred.

Figure 6:
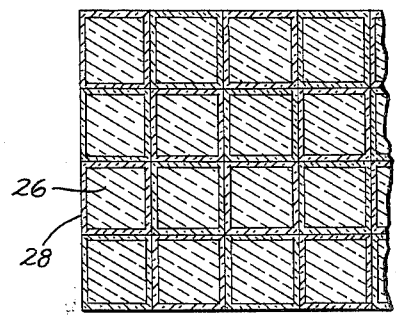
FIG. 6 is a cross-sectional view of an assembly of parts for use in forming a component of the type shown in FIG. 4.

Each rod or shaft 12 to be employed in the forming of the bundle 14 is preferably formed of a glass of good optical or ophthalmic properties and of a fairly high refractive index so that a high degree of internal reflection will be obtained. While plain uncoated circular rods will provide fair results for certain purposes in finished image transfer devices produced therefrom, it is preferred to first apply about each rod, whether of circular shape or otherwise, an outer thin surface layer or coating of glass of a relatively lower refractive index; and an assembly having such an arrangement of circular cores 22 of high index glass and outer coatings 24 of low index glass is indicated by way of example in FIG. 2, and another assembly having high index glass cores 26 of square cross-section and low index glass coatings 28 is indicated in FIG. 6. This outer low index layer 24 or 28 may be, for instances, integrally secured in place upon the cores 22 or 26 by momentarily dipping each rod into a molten batch of glass of lower refractive index. Any other suitable method of applying a thin uniform continuous low index glass layer to the core 22 or 26 may be employed. It is important, however, that such an outer layer or coating of low refractive index be not only relatively thin but also entirely continuous; the thinness being so that a minimum of the total end area of the resulting fused bundle of rods will be utilized by the combined areas of all outer coatings or layers, and the continuity requirement being so that high internal reflection of light at all places along the length of each core will take place at the interface between the low index coating and the high index core later when the finished device, resulting therefrom, is put into service.

If a plurality of glass rods are clamped or secured together in a bunch and this bunch then hung in a vertical position in a furnace or the like and slowly heated to their softening temperature and maintained at this temperature while the rods of the bundle elongate under their own weight, or are drawn out, each rod will elongate intermediate the clamped ends thereof. Furthermore, each rod will retain its own individual cross-sectional shape during such elongation and each stretched out portion will be spaced from the stretched out portions of adjacent rods of the bundle. In other words, no adhesion or sticking together of adjacent rods as would be desired for carrying out of the invention under these conditions will occur.

Figure 3:
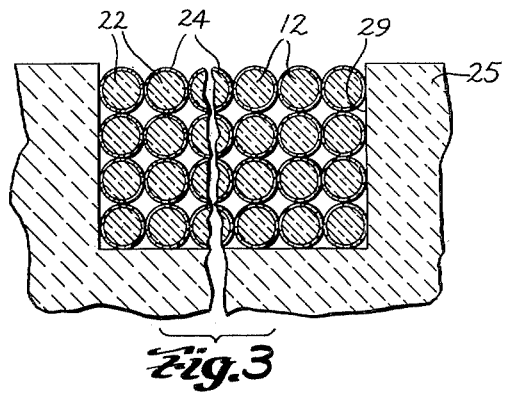
FIG. 3 is a vertical sectional view of apparatus for use in carrying out steps of said method and showing parts enlarged to a different scale.

Instead of such a procedure, it has been found, for example, that a plurality of rods may be placed together in a suitably shaped recess in a ceramic or carbonaceous support, or even in a metal or metal clad support, such as is generally indicated by the support 25 in FIG. 3 having an elongated recess 29 of proper size, and slowly heated in air or in a vacuum to bring the rods to a fusing temperature. (Of course, the temperature to which such a bundle of rods is raised will depend directly upon the particular melting characteristics of the glass compositions on the outer surface of the rods being used), but it should be such as to cause a fusing or welding of the contacting portions of adjacent rods into an integral member or cluster without producing or allowing any undesired change in shape to occur either in the coatings on the rods or in the cores thereof.

While the support 25 is shown with the rods 12 in a horizontal position therein, such a support could be provided with a suitable cover member (not shown) arranged to press lightly on the rods in the recess 29 of the support while the rods are being heated and fused; and in such a case these rods would not need to be in any particular position. Also, as will later appear, other means may be used to clamp a plurality of rods together during fusing, without being dependent upon the specific position of the rods.

When the fused assembly or cluster of rods has cooled sufficiently to allow it to be moved without injury, it may be transferred to a tube type furnace, or equivalent heating unit, and heated, preferably at one end portion only, to its softening temperature. When the temperature is high enough, that is, when the glass at the end of the fused bundle has become uniformly quite soft, the free end of this softened glass may be drawn out at a uniform and continuous rate into a small multi-fibered rod or strand of greatly reduced cross-sectional size. Under such conditions, the individual coated rods of the initially fused bundle will remain fused together and the geometric pattern of the fused parts thereof will remain unaltered even though the cross-sectional size of the resulting multi-fibered strand as well as the cross-sectional sizes of the several individual fibers thereof will be simultaneously greatly reduced.

For example, it has been found in practice possible to coat the outer surface of individual 3/16" high index rods of glass (having a refractive index in the neighborhood of approximately 1.61 to 1.75) with an outer thin layer of low index glass (having a refractive index in the neighborhood of approximately 1.52 to 1.54), to assemble and fuse a plurality of these individually coated rods together to form a unitary assembly or cluster. (Such an assembly might vary in actual commercial use of the invention in cross-sectional size from approximately 3/4 of an inch to 4 or 6 inches in diameter.) Thereafter the free end of this fused assembly was heated to a softening temperature and drawn out as a continuous multifibered strand having substantially the same cross-sectional shape but of a greatly reduced size; reduced from approximately 3/4 of an inch down to approximately 0.10 of an inch. If it had been desired, this strand could have been reduced even more during this initial drawing operation. Thus, even though the cross-sectional size of the fused bundle was reduced as much as 25 to 1 in a single drawing step, nevertheless, its geometric cross-sectional configuration was substantially unchanged.

Such a multifibered strand is relatively stiff. Accordingly, from the standpoint of both convenience and efficiency during production, the strand being continuously drawn out may be periodically severed into equal lengths and grouped or stacked together to form a second bundle. A bundle of strands of this size might find utility in certain places wherein only a moderate degree of image resolution is required since the several light-conducting fibers thereof are of fairly small cross-sectional size. Furthermore since strands of this size may be flexed small amounts, it may be that at times one may wish to take advantage of this flexibility; such as in aligning the bunched ends of such a bundle of strands with elements of an associated optical apparatus. In other instances a group of these multifibered strands may be slowly heated to a temperature wherein the strands will soften enough to allow all of the strands to be simultaneously shaped or curved intermediate their ends.

In cases wherein a higher degree of resolution than that mentioned above is desired or required, in optical images being transferred by the improved device or component, the additional procedure may be followed to produce a finished structure which will have a very large number of optically insulated filaments of very small cross-sectional size, each filament thereof providing a separate and independent path for a portion of the light of the image being transferred thereby.

A sizable number of such multifibered strands may be grouped together to form a bundle and clamped together, or positioned in a suitably shaped recess in a ceramic support, or the like, and slowly heated to fuse these strands together. Thereafter this bundle will be heated slowly at one end thereof and a thread composed of many fine optically isolated filaments withdrawn therefrom; the number of filaments of course corresponding to the number of cores used initially. The cross-sectional size of such a thread can be controlled during drawing by control of the amount of heat being applied to the end portion of the fused bundle of strands and by the rate at which the thread is withdrawn.

Of real interest, however, is the fact that the resulting thread, nevertheless, will still retain very closely the geometric pattern originally provided the bundle and each filament will have a core of high index material optically separated or optically isolated from adjacent filaments by a surrounding layer or coating of low index transparent material.

Many lengths of these multifilament threads are then grouped or bunched together to build up an assembly having the cross-sectional end area desired. The threads of the assembly may be secured together at one or both ends, or even throughout a preselected portion thereof, or even throughout the entire length of the assembly by suitable binding means, or by cement or even by fusing the threads thereof together.

By such a procedure, an optical device or component having an appreciable area may be built up and this device or component will have a much higher degree of image resolution. It is also possible to utilize such an assembly of multifilament threads which have been secured together throughout an extended length thereof by cutting by known means this secured together length of threads into a number of shorter sections for finishing into optical components. Generally, but not always, the end surface or surfaces of such an optical component would be optically finished in known manner, as by grinding, or polishing, or both, so as to readily transmit light therethrough. If an end of the component, however, is to be immersed, for example, in a liquid of like refractive index grinding and polishing of the end surface would not be required.

It may be desirable to further reduce the cross-sectional size of the multifilament threads just described, as for example, wherein even greater image resolution provided by the finished optical device is desired. This can be obtained by repeating the assemblying, fusing, drawing and finishing steps mentioned above. It has been found, for example, that starting with a fused bundle of 3/16 inch coated rods the bundle can be reduced to a thread of as little as 0.001 of an inch or even smaller. Microscopic examination of cross sections of such multifilament threads produced by this method nevertheless reveals that each individual filament thereof retains its original shape. Such a thread is quite flexible. Thus, if a large number of these threads, each having such a multifilament construction, are bundled together at their opposite ends, a very flexible image transfer device can be produced.

Figure 7:
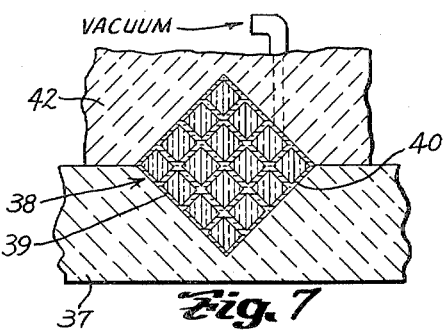
FIG. 7 is a sectional view of apparatus which may be used in performing assembly and fusing steps of said method.

In assembling and fusing together a number of individual coated rods, it may be desirable to employ a recessed support of modified design and such a support is shown at 37 in FIG. 7. This support is of a type having a V-shaped receiving groove or recess 38 therein with the sloping sidewalls thereof disposed at 90° to each other as indicated by the numerals 39 and 40. A cover member having a similarly shaped recess is indicated at 42; and in a preferred construction both the recess in the support 37 and the recess in the cover member 42 would have end walls so as to completely enclose and confine the entire assembly during fusing. Additionally the cover and support would be made of suitable heat resistant material and would be made to fit closely and even press slightly upon the assembled coated rods. In this manner a good contact between adjacent surfaces of the rods will be assured during the fusing operation. When such a support and cover are used together the fusing operation can be performed with the assembly disposed in a vertical, horizontal or any other position desired. It may even be desirable to perform the fusing step in an oven which has been evacuated.

The fusing together of a plurality or bundle of transparent coated rods like those shown at 12 in FIG. 1, may also be carried out in the following manner. A plurality or bundle of coated rods which may be temporarily held together in properly assembled relation by suitable means (not shown) is slowly fed into and through a bore 44a in a first heating element 44 (see FIG. 8) and into a gripped position between a pair of slowly rotating rollers 45 and 46. These rollers are mounted on a pair of drive shafts 48 and 50 journaled respectively in blocks 52 and 54 and are turned in opposite directions by drive means of known construction 55.

As clearly indicated by double headed arrows 56 and 58 in FIG. 9, these blocks 52 and 54 are shiftable toward and away from each other by suitable means (not shown) so that all of the rods of the bundle 43 will be held in firm contact with one another. The rollers 45 and 46 have their peripheral surfaces 45a and 46a recessed and these recessed surfaces are carefully controlled in accordance with the size and shape of the bundle of rods to be gripped thereby so that all of the rods of the bundle will be pressed uniformly inwardly toward each other. For example, in instances wherein the coated rods of the bundle are square (see FIG. 9), the surface shapes of the two rollers 45 and 46 will be such as to provide a space therebetween which is substantially square. Or if a round bundle of rods is to be formed, for example, then the transverse shape of the peripheral surface of each roller of the pair may be made substantially semi-circular, and thus the two rollers together will define a nearly circular space for confining the rods of the bundle therebetween. Other shapes of bundles of rods can be formed by the use of other transverse surface shapes for such a pair of rollers.

The blocks 52 and 54 besides being shiftable are also constructed and arranged to function as heating elements (preferably electrically heated) which may be readily controlled to maintain whatever temperature is desired. Thus in the region adjacent the rollers 45 and 46 a fusing zone 59 will be formed. Of course, the bundle of coated rods 43 approaching this fusing zone will be most likely preheated by the heating element 44.

Immediately following and adjacent this fusing zone 59, there is shown another heating element or elements 60, which may be separately controlled and preferably operated at a somewhat higher temperature than required for the fusing operation. The purpose of heating elements 60 is to provide a working zone 62 wherein the fused bundle of rods may be drawn out into a multi-fibered strand of considerably reduced cross-sectional size as indicated at 64. One or more pairs of power operated rolls 66 may be provided for this purpose, it being understood of course that they will be located far enough away from the drawing or working zone 62 so as not to deform the strand in an undesired manner while soft, and also understood that their rates of travel will be regulated in accordance with the temperature of the drawing zone, so that a desired size of multifibered strands will be formed.

As suitable lengths of this multifibered strand are produced they may be sheared and stacked together. An optical component or device providing low image resolution can be formed from such strands by cementing or fusing same together in side-by-side relation. Or if a higher degree of image resolution is desired it may be desirable to group a number of such strands together, and in substantially the same manner as mentioned above allow this group of strands to slowly travel between a second similar pair of pressure rolls in a fusing zone, and then after fusing be again heated to a softening temperature and drawn out even further.

Thus the fused together strands having a number of optically separated light paths therethrough will be greatly reduced in size and each individual light path thereof will be likewise reduced. Nevertheless, in this manner the original coated cores 12 can be reduced in one, two or even more cycles of operation each including the steps of assembly, fusing, softening, drawing and reassembly until a plurality of microscopic filaments or optically separated light paths of nearly any cross-sectional size desired can be produced.

In FIG. 10 is shown a modified form of apparatus by which multifibered strands, or the like, having a controlled amount of taper therein may be produced. In this apparatus the fused together bundle of rods or strands are indicated at 68 being moved slowly through the apparatus in the direction indicated by the arrow 70 by driven rollers 72 and by others not shown. The leading end of the bundle 68 will be, by the time it reaches and passes beyond the rollers 72, heated by the preliminary heater 74 to such a temperature that it will start to soften.

However, as this bundle of rods or multifibered strands moves forward a pair of gripping fingers diagrammatically indicated in full lines at 76 will simultaneously travel toward the forward end of this strand and grip the end of the strand as indicated by the dotted lines 76A. Thereafter the fingers 76 will be caused to move (by means not shown) in the opposite direction at a controlled rate of speed which will be such as to draw out the end of the bundle into the taper desired. This drawing out step will be done within one or more separately controllable heaters indicated at 78 and 80, respectively, and thus the temperatures in the heating zones 78A and 80A therewithin may be separately and differently regulated.

When a tapered portion 81 of desired length and shape has been produced a pair of shearing knives, or equivalent mean, 82 will operate to sever this tapered portion from the incoming bundle and then fingers 76 will move outwardly to the position indicated at 78B and drag the tapered portion out of the heaters 78 and 80 and onto a supporting table 83 as indicated by dotted line 86 at a more rapid rate. Thereafter a second pair of shears, or other known cutting means 84, will cut the tapered portion 81 free from the gripped butt end 88. At this time the tapered portion 86 may be moved laterally of the table 83, as by a pusher 90, and onto a conveyor diagrammatically indicated at 92 for movement through an annealing oven or the like.

In FIG. 11 a plurality of tapered portions of multi-fibered or multifilament strands are shown collectively constituting an image transfer device 94 of the image enlarging type, and in this particular device one end 96 thereof has been finished to accommodate the face of a cathode ray tube while the other end is arranged to fit against the rear surface of a ground glass screen 98 or the like. This device 94, it will be appreciated, is curved intermediate its ends. This curving can be accomplished by either slowly heating each individual strand to a softening temperature or heating groups of such strands or even the entire device to a softening temperature and allowing same to curve or sag into place. However, heating and curving of groups of strands is preferred since on the one hand the heating and softening period required is not as great as when all strands are together and on the other hand would be much faster than individually curving each separate multifibered or multifilament strand.

In FIG. 12 is shown at 100 by way of example a different form of optical device or component which the present invention may take, and it will be obvious that many other useful forms are also possible. This optical device 100 is in fact a component which may be used between lenses of an optical system to transfer an image from one curved face thereof to the other differently curved face thereof. Thus a change in field curvature without a change in magnification can be effected. The component nevertheless is formed by a very large number of very small strands cemented or fused together with each strand thereof in turn being formed of a plurality of individual light conducting elements or filaments of high index transparent material optically insulated or optically isolated from all adjacent strands by means of a layer or coating of clear transparent material of lower refractive index.

At places wherein the words "image resolution" have been used in various parts of the foregoing specification with reference to optical devices and optical components made in accordance with the present invention, it is intended that these words wil be interpreted in accordance with the physical characteristics and requirements of the optical device or associated means with which the improved image transfer device is to be used. For example, if the improved device is to form the face of a television tube which does not enlarge, it may look somewhat like the component 100 shown in FIG. 12, although the cross-sectional size of the individual filaments or light conducting elements thereof may be very much different from that required for a similarly appearing device being used between lens elements of an optical system.

It is to be understood that when a low index glass is used as described herein as the light-reflecting coating for the glass-forming the cores or centers of the rods or filaments, that any two high and low index glasses chosen to work together will be selected so that certain other desirable physical characteristics are also provided. For example, preferably, both glasses should be of good durability, should be transparent and colorless, and should have nearly the same coefficient of expansion (at least within the range from annealing to room temperatures). And, of course, both glasses should have nearly the same melting characteristics or the low index glass forming the coating should have a slightly lower melting point.

Thus, it will be appreciated that a total reduction in size in the individual fibers or filaments of each fused together multiple element strand of the optical devices or components of the character described of as much as 500 to 1, or even more, can be produced, while still having each individual element or filament thereof optically separated from adjacent elements or filaments and thus each will retain its selective light conducting properties and high light conducting efficiency.

Having described my invention, I claim:

1. The method of forming an optical image transfer component comprising applying to the side walls of each rod of a plurality of rigid elongated transparent glass rods of a relatively high refractive index, and of similar size and cross-sectional shape, a relatively thin encircling coating of glass of a relatively low refractive index, positioning said coated rods in side-by-side parallel closely bunched contacting relation to each other so as to form a compact bundle, evacuating the space surrounding said bundle and slowly raising the temperature of said bundle so as to cause the contacting portions of adjacent coated rods to fuse together, increasing and controlling the temperature of the fused bundled so that an end portion thereof will be maintained at a softened temperature, drawing from the softened end of said fused bundle a unitary strand of high and low index glasses having a cross-sectional arrangement geometrically similar to that of said fused bundle but of materially reduced size, severing said strand into a plurality of separate sections of substantially equal length, assembling a relatively large number of said sections together in side-by-side relation, repeating said fusing, heating, drawing, severing and assembling steps a sufficient number of times to produce a very large number of individual light-conducting elements each comprising a plurality of cores of high index glass and relatively small predetermined size optically insulated from one another by low index glass, fixedly securing said relatively large number of elements together, and optically finishing the opposite ends of said secured elements so as to provide an optical component having entrance and exit areas of predetermined size and of like geometric arrangement.

2. The method of forming an optical image transfer component comprising applying to the side walls of each rod of a plurality of rigid elongated transparent glass rods of relatively high refractive index, and of similar size and cross-sectional shape, a relatively thin encircling coating of glass of relatively low refractive index, positioning said coated rods in side-by-side closely bunched contacting relation with each other so as to form a compact bundle having substantially no space therein capable of including trapped air, slowly raising the temperature of said bundle so as to cause the contacting portions of adjacent coated rods to fuse together, increasing and controlling the temperature of the fused bundle so that an end portion thereof will be maintained at a softening temperature, drawing from the softened end of said fused bundle a unitary strand of high and low index glasses having a cross-sectional arrangement geometrically similar to that of said bundle but of materially reduced size, severing said strand into a plurality of separate sections of substantially equal length, assembling a relatively large number of said sections together in side-by-side relation, repeating said fusing, heating, drawing, severing and assembling steps a sufficient number of times to produce a very large number of individual light-conducting elements each comprising a plurality of cores of relatively small predetermined size optically insulated from one another by low index glass, fixedly securing said elements together and optically finishing the opposite ends of said secured elements so as to provide an optical component having entrance and exit areas of predetermined size and of like geometric arrangement.

3. The method of forming an optical image transfer component comprising applying to the side walls of each rod of a plurality of rigid elongated transparent glass rods of relatively high refractive index, and of similar size and cross-sectional shape, a relatively thin encircling coating of glass of a relatively low refractive index, positioning said coated rods in side-by-side parallel closely bunched contacting relation to each other so as to form a compact bundle having substantially no space therein capable of including trapped air, evacuating the space surrounding said bundle and slowly raising the temperature of said bundle so as to cause the contacting portions of adjacent coated rods to fuse together, increasing and controlling the temperature of the fused bundle so that an end portion thereof will be maintained at a softening temperature, drawing from the softened end of said fused bundle a unitary strand of high and low index glasses having a cross-sectional arrangement geometrically similar to that of said fused bundle but of materially reduced size, severing said strand into a plurality of separate sections of substantially equal length, assembling a relatively large number of said sections together in side-by-side relation, repeating said fusing, heating, drawing, severing and assembling steps a sufficient number of times to produce a very large number of individual light-conducting elements each comprising a plurality of cores of relatively small predetermined size optically insulated from one another by low index glass, fixedly securing said elements together and optically finishing the opposite ends of said secured elements so as to provide an optical component having entrance and exit areas of predetermined size and of like geometric arrangement.

4. The method of forming an optical image transfer component comprising applying to the side walls of each rod of a plurality of rigid elongated transparent glass rods of a relatively high refractive index, and of a similar size and cross-sectional shape, a relatively thin encircling coating of glass of a relatively low refractive index, positioning said coated rods in side-by-side parallel closely bunched contacting relation to each other so as to form a compact bundle having a plurality of small spaces uniformly dispersed among the coated rods of said bundle, slowly raising the temperature so as to cause the contacting portions of adjacent coated rods to fuse together, increasing and controlling the temperature of the fused bundle so that an end portion thereof will be maintained at a softening temperature, drawing from the softened end of said bundle a unitary strand of high and low index glasses having a cross-sectional arrangement geometrically similar to that of said bundle but of materially reduced size, severing said strand into a plurality of separate sections of substantially equal length, assembling a relatively large number of said sections together in side-by-side relation, repeating said fusing, heating, drawing, severing and assembling steps a sufficient number of times to produce a very large number of individual light-conducting elements each comprising a plurality of cores of relatively small predetermined size optically insulated from one another by low index glass, fixedly securing said relatively large number of elements together, and optically finishing the opposite ends of said secured elements so as to provide an optical component having entrance and exit areas of predetermined size and of like geometric arrangement.

5. The method of forming an optical image transfer component comprising applying to the side walls of each rod of a plurality of rigid elongated transparent rods of glass of relatively high refractive index and of similar size and cross-sectional shape, a relatively thin encircling coating of glass of a relatively low refractive index, positioning said coated rods in side-by-side parallel closely bunched contacting relation to each other so as to form a compact bundle, slowly raising the temperature of said bundle to cause the contacting portions of adjacent coated rods to fuse together, increasing and controlling the temperature of the fused bundle so that an end portion thereof will be maintained at a softened temperature, repeatedly drawing and severing from the softened end of said fused bundle multi-fibered tapered unitary strands of high and low index glasses each having a cross-sectional arrangement which is geometrically similar to that of said fused bundle but of materially reduced size, assembling and securing a very large number of said tapered strands together in side-by-side bunched relation so as to form a component of appreciable size, and optically finishing the opposite ends of the strands of said component so as to form entrance and exit areas of different sizes.

6. The method set forth in claim 5 and additionally comprising the steps of slowly raising the temperature of said component to a softening temperature and thereafter causing said component to assume a predetermined bent shape intermediate the entrance and exit areas thereof without materially changing the cross-sectional arrangement of the fibers thereof adjacent said entrance and exit areas.

7. The method of forming an optical image transfer component comprising applying to the side walls of a plurality of rigid elongated transparent glass rods of a relatively high refractive index, and of similar size and cross-sectional shape, a relatively thin encircling coating of glass of a relatively low refractive index, positioning said coated rods in side-by-side parallel closely bunched contacting relation to each other so as to form a compact bundle, slowly raising the temperature of said bundle to cause the contacting portions of adjacent coated rods to fuse together, increasing and controlling the temperature of the fused bundle so that an end portion thereof will be maintained at a softened temperature, drawing from the softened end of the fused bundle a unitary multi-fibered strand of high and low index glasses each having a cross-sectional arrangement geometrically similar to that of said fused bundle but of materially reduced size, severing said multi-fibered strand into separate members of substantially equal length, assembling said multi-fibered members into a side-by-side parallel closely bunched contacting relation to each other so as to form a compact bundle, heating an end portion of said bundle to fusing and softening temperature, and drawing from said last-mentioned end a unitary relatively thin multi-filament strand, severing said multi-filament strand into multi-filament threads of equal length, securing a very large number of said multi-filament threads together in side-by-side relation so as to form a light-conducting component of appreciable size, and optically finishing at least one end of said component for the transmission of light therethrough.

8. The method of forming a fiber optical light transfer device comprising applying to the side walls of each rod of a plurality of rigid elongated transparent glass rods of a relatively high refractive index, and of substantially similar size and cross-sectional shape, a relatively thin encircling coating of glass of a relatively low refractive index, positioning said coated rods so as to have at least a selected region thereof in side-by-side parallel bunched contacting relation to each other so as to form at said region a compact bundle, slowly raising the temperature of said bundle so as to cause the contacting portions of adjacent coated rods to fuse together, increasing and controlling the temperature of the fused bundle so that an end portion thereof will be maintained at a softened temperature, drawing from the softened end a unitary strand of high and low index glasses having a cross-sectional arrangement geometrically similar to that of said fused bundle but of materially reduced size, severing said strand into a plurality of separate sections of substantially equal lengths, assembling a plurality of said sections together in side-by-side relation, repeating said fusing, heating, drawing, severing and assembling steps a sufficient number of times to produce a very large number of individual light-conducting elements each comprising a plurality of cores of high index glass and relatively small predetermined size optically insulated from one another by low index glass, and fixedly securing said relatively large number of elements together so as to produce a light transfer device having entrance and exit areas of predetermined sizes.

9. The method of forming a fiber optical light transfer device comprising applying to the side walls of each rod of a plurality of rigid elongated transparent glass rods of a relatively high refractive index, and of substantially similar size and cross-sectional shape, a relatively thin encircling coating of glass of a relatively low refractive index, positioning said coated rods so as to have at least a selected region thereof in side-by-side parallel bunched contacting relation to each other so as to form at said region a compact bundle, evacuating the space surrounding said compact bundle and slowly raising the temperature of said compact bundle so as to cause the contacting portions of adjacent coated rods to fuse together, increasing and controlling the temperature of the fused bundle so that an end portion thereof will be maintained at a softened temperature, drawing from the softened end a unitary strand of high and low index glasses having a cross-sectional arrangement geometrically similar to that of said fused bundle but of materially reduced size, severing said strand into a plurality of separate sections of substantially equal lengths, assembling a plurality of said sections together in side-by-side relation, repeating said fusing, evacuating, heating, drawing, severing and assembling steps a sufficient number of times to produce a very large number of individual light-conducting elements each comprising a plurality of cores of high index glass and relatively small predetermined size optically insulated from one another by low index glass, and fixedly securing said relatively large number of elements together so as to produce a light transfer device having entrance and exit areas of predetermined sizes.

10. The method of forming a fiber optical light transfer device comprising applying to the side walls of each rod of a plurality of rigid elongated transparent rods of glass of relatively high refractive index and of similar size and cross-sectional shape, a relatively thin encircling coating of glass of a relatively low refractive index, positioning said coated rods so as to have at least a selected region thereof in side-by-side parallel bunched contacting relation to each other so as to form at said region a compact bundle, slowly raising the temperature of said bundle to cause the contacting portions of adjacent coated rods to fuse together, increasing and controlling the temperature of the fused bundle so that an end portion thereof will be maintained at a softened temperature, repeatedly drawing and severing from the softened end of said fused bundle multi-fibered tapered unitary strands each of high and low index glasses and having a cross-sectional arrangement which is geometrically similar to that of the fused bundle but of material reduced size, assembling and securing a very large number of said tapered strands together in side-by-side bunched relation so as to form a light transfer device having entrance and exit areas of predetermined sizes.

11. The method of forming a light transfer optical device which consists of a closely packed group of generally parallel light-conducting fibers of high index glass separated from each other by layers of low index glass, said method comprising the steps of stacking in a parallel array a plurality of high index transparent glass rods each of which have been previously coated with a thin layer of low index glass, holding said array of coated rods in contacting relation with each other, heating said array so as to weld same into a firmly bonded bundle, heating at least an end portion of said bundle and drawing same down into a strand the size of which is only a fraction of the original size of said bundle while retaining substantially the original geometric cross-sectional arrangement of said bundle, severing said strand into unit lengths, grouping and retaining said lengths in stacked relatively intimate side-by-side relation to each other, heating said group to weld said lengths together, and repeating said drawing, severing and grouping steps until an optical device of desired size is obtained.

12. The method of forming a bundle of light transfer fibers of a given small cross-sectional size comprising coating a plurality of relatively large transparent high index rods of glass throughout the entire outer side surfaces thereof with relatively thin continuous coatings of low index glass, bundling said coated rods of glass with portions of said coated side surface portions thereof in adjacent relatively intimate side-by-side relation with each other, heating while holding said adjacent portions of said coated rods of glass together to a temperature sufficient to cause the adjacent coatings to fuse with each other and form a unitary bundle, and thereafter drawing the unitary bundle of coated rods down to said given fiber size while substantially retaining the initial related cross-sectional geometrical arrangements of said rods and coatings.

13. The method of forming a bundle of light transfer fibers of a given small cross-sectional size comprising coating a plurality of relatively large transparent high index rods of glass having relatively flat side surface portions with relatively thin continuous coatings of low index glass, bundling said rods together and causing said relatively flat coated side surface portions to be positioned in adjacent relatively intimate side-by-side relation with each other, heating said bundle while retaining said relation to a temperature sufficient to cause said adjacent coatings to fuse with each other, and thereafter drawing said unitary bundle of coated rods down to said given fiber size and in such manner as to cause portions of the side surfaces thereof to retain said engagement and to substantially retain the initial cross-sectional geometrical relationship of said rods and coatings.

14. The method of forming a bundle of light transfer fibers of a given small cross-sectional size comprising coating a plurality of relatively large transparent high index hexagonal rods of glass throughout the entire outer side surfaces thereof with relatively thin continuous coatings of low index glass, bundling said coated rods of glass with coated side surface portions thereof in adjacent side-by-side relation with each other, heating while pressing said adjacent portions of said coated rods of glass together to a temperature sufficient to cause the adjacent coatings to fuse with each other and thereafter drawing said unitary bundle of coated rods down to said given fiber size and in such manner as to cause the major portions of the side surfaces thereof to assume substantially hexagonal side surface engagement with each other.

15. The method of forming an air-tight optical image transfer component of appreciable exposed front and rear surface areas, said method comprising applying to the side walls of each rod of a plurality of rigid elongated transparent glass rods of relatively high refractive index, a relatively thin encircling coating of glass of relatively low refractive index, positioning said coated rods with portions thereof in side-by-side closely bunched contacting relation with each other so as to form a compact bundle, slowly raising the temperature of said bundle so as to cause the contacting portions of the adjacent coated rods to fuse together, controlling the temperature of the fused bundle so that an end portion thereof will be maintained at a softening temperature, drawing from the softened end of said fused bundle a unitary strand of high and low index glasses having a cross-sectional arrangement geometrically similar to that of said bundle but of materially reduced size, severing said strand into a plurality of separate similar sections, assembling an appreciable number of said sections together in side-by-side closely bunched contacting relation, repeating said assembling, heating, fusing, drawing, and severing steps so as to produce the very large number of individual light-conducting elements needed for forming said optical component, and with each of said elements comprising a plurality of high index glass cores of relatively small predetermined cross-sectional size optically insulated from one another by low index glass, assembling said individual light-conducting elements and heating said elements for such a time and at such a temperature as to cause said elements to fuse together and form said air-tight component, and optically finishing the opposite faces of said component so as to provide thereon entrance and exit areas of predetermined sizes and with the opposite ends of said cores disposed in like geometric arrangement.

References Cited in the file of this patent
UNITED STATES PATENTS

| | | |
|---|---|---|
| 1,751,584 | Hansell | Mar. 25, 1930 |
| 2,294,429 | Stutz | Sept. 1, 1942 |
| 2,313,296 | Lamesch | Mar. 9, 1943 |
| 2,354,591 | Goldsmith | July 25, 1944 |
| 2,393,979 | Everett | Feb. 5, 1946 |
| 2,532,091 | Everett | Nov. 28, 1950 |
| 2,652,660 | Kurz | Sept. 22, 1953 |
| 2,752,731 | Altosaar | July 3, 1956 |
| 2,825,260 | O'Brien | Mar. 4, 1958 |